(12) United States Patent
Nagata

(10) Patent No.: US 11,802,889 B2
(45) Date of Patent: Oct. 31, 2023

(54) INERTIAL SENSOR AND INERTIAL MEASUREMENT DEVICE

(71) Applicant: SEIKO EPSON CORPORATION, Tokyo (JP)

(72) Inventor: Kazuyuki Nagata, Minowa-machi (JP)

(73) Assignee: SEIKO EPSON CORPORATIONN, Tokyo (JP)

( * ) Notice: Subject to any disclaimer, the term of this patent is extended or adjusted under 35 U.S.C. 154(b) by 0 days.

(21) Appl. No.: 17/742,914

(22) Filed: May 12, 2022

(65) Prior Publication Data

US 2022/0365109 A1 Nov. 17, 2022

(30) Foreign Application Priority Data

May 14, 2021 (JP) ................................. 2021-082188

(51) Int. Cl.
*G01P 15/18* (2013.01)
*G01P 15/125* (2006.01)
*G01P 3/48* (2006.01)

(52) U.S. Cl.
CPC ............ *G01P 15/18* (2013.01); *G01P 15/125* (2013.01); *G01P 3/48* (2013.01)

(58) Field of Classification Search
CPC ......... G01P 15/125; G01P 15/18; G01P 15/08
See application file for complete search history.

(56) References Cited

U.S. PATENT DOCUMENTS

| | | | | |
|---|---|---|---|---|
| 2006/0169043 A1* | 8/2006 | McNeil | ................. | G01P 15/125 73/514.01 |
| 2009/0031809 A1* | 2/2009 | Lin | ....................... | G01P 15/125 73/514.32 |
| 2009/0107238 A1* | 4/2009 | Guo | .................... | G01P 15/0802 73/514.32 |
| 2011/0048131 A1* | 3/2011 | Reinmuth | ............. | B81B 3/0051 73/504.12 |
| 2012/0297879 A1* | 11/2012 | Ullrich | .................. | G01P 15/125 73/514.32 |
| 2013/0192370 A1* | 8/2013 | Yoda | ....................... | G01P 15/02 73/514.01 |
| 2014/0338451 A1* | 11/2014 | Takagi | .................. | G01P 15/125 73/514.32 |
| 2015/0013458 A1* | 1/2015 | Tanaka | .................. | B81B 3/0051 73/514.35 |

(Continued)

FOREIGN PATENT DOCUMENTS

| | | |
|---|---|---|
| CN | 210690623 | 6/2020 |
| JP | 2013-156121 | 8/2013 |

(Continued)

*Primary Examiner* — Helen C Kwok

(74) *Attorney, Agent, or Firm* — Rankin, Hill & Clark LLP

(57) ABSTRACT

An inertial sensor is an inertial sensor for detecting a physical quantity based on a displacement in a Z axis when defining three axes perpendicular to each other as an X axis, a Y axis, and the Z axis, and is provided with a substrate, a movable body which is fixed to the substrate, oscillates around an oscillation axis along the X axis, and has two planes opposed to each other and side surfaces connecting the two planes to each other, and a limiter which is fixed to the substrate, and is opposed to the side surfaces of the movable body, wherein the movable body is provided with a resilient portion in a portion opposed to the limiter.

7 Claims, 15 Drawing Sheets

(56) References Cited

U.S. PATENT DOCUMENTS

| | | | | |
|---|---|---|---|---|
| 2015/0096378 A1* | 4/2015 | Kigure | ............... | G01P 1/003 |
| | | | | 73/514.32 |
| 2015/0241466 A1* | 8/2015 | Tanaka | ............... | G01P 15/125 |
| | | | | 73/514.32 |
| 2015/0316582 A1* | 11/2015 | Tanaka | ............... | G01P 15/125 |
| | | | | 73/514.32 |
| 2016/0061858 A1* | 3/2016 | Tanaka | ............... | G01P 15/131 |
| | | | | 73/514.18 |
| 2018/0252744 A1* | 9/2018 | Kamada | ............... | G01P 15/18 |
| 2019/0025338 A1* | 1/2019 | Matsuura | ............... | G01P 15/0802 |
| 2019/0094262 A1* | 3/2019 | Ito | ............... | G01P 15/0802 |
| 2019/0107397 A1* | 4/2019 | Ito | ............... | G01C 21/20 |
| 2019/0234991 A1* | 8/2019 | Kihara | ............... | G01P 15/125 |
| 2020/0241032 A1* | 7/2020 | Nagata | ............... | B60W 50/045 |
| 2020/0249022 A1* | 8/2020 | Nagata | ............... | G01P 15/18 |
| 2021/0063432 A1* | 3/2021 | Fujimoto | ............... | G01P 13/04 |

FOREIGN PATENT DOCUMENTS

| | | |
|---|---|---|
| JP | 2015-017886 | 1/2015 |
| JP | 2018-146330 | 9/2018 |
| JP | 2019-039804 | 3/2019 |
| JP | 2019-070606 | 5/2019 |
| JP | 2019-132593 | 8/2019 |

\* cited by examiner

INERTIAL SENSOR AND INERTIAL MEASUREMENT DEVICE

The present application is based on, and claims priority from JP Application Serial Number 2021-082188, filed May 14, 2021, the disclosure of which is hereby incorporated by reference herein in its entirety.

BACKGROUND

1. Technical Field

The present disclosure relates to an inertial sensor and an inertial measurement device.

2. Related Art

In recent years, an inertial sensor manufactured using an MEMS (Micro Electro Mechanical Systems) technology has been developed. In, for example, JP-A-2019-39804 (Document 1), as such an inertial sensor, there is described an MEMS device which includes a base provided with a supporter and a stationary electrode, a movable body supported by the supporter with a principal surface opposed to the stationary electrode, and an abutment opposed to at least a part of an outer edge of the movable body to limit a rotational displacement in an in-plane direction of the principal surface, and which is capable of detecting the acceleration in a vertical direction.

However, in the MEMS device as the inertial sensor described in Document 1, when an excessive rotational displacement in the in-plane direction of the principal surface occurs in the movable body due to an intensive impact or the like from the outside, the movable body and the abutment collide with each other, and when the movable body repeats the collision as a single rigid body with certain energy, there is a possibility that a sticking phenomenon called stiction occurs between the movable body and the abutment.

SUMMARY

An inertial sensor is an inertial sensor for detecting a physical quantity based on a displacement in a Z axis when defining three axes perpendicular to each other as an X axis, a Y axis, and the Z axis, and includes a substrate, a movable body which is fixed to the substrate, oscillates around an oscillation axis along the X axis, and has two planes opposed to each other and a side surface connecting the two planes to each other, and a limiter which is fixed to the substrate and which is opposed to the side surface of the movable body, wherein the movable body includes a resilient portion in a portion opposed to the limiter.

An inertial measurement device includes the inertial sensor described above, and a controller configured to perform control based on a detection signal output from the inertial sensor.

DESCRIPTION OF EXEMPLARY EMBODIMENTS

1. First Embodiment

First, an inertial sensor 1 according to a first embodiment will be described citing an acceleration sensor for detecting the acceleration in a vertical direction as an example with reference to FIG. 1, FIG. 2, FIG. 3, and FIG. 4.

Figure 1:
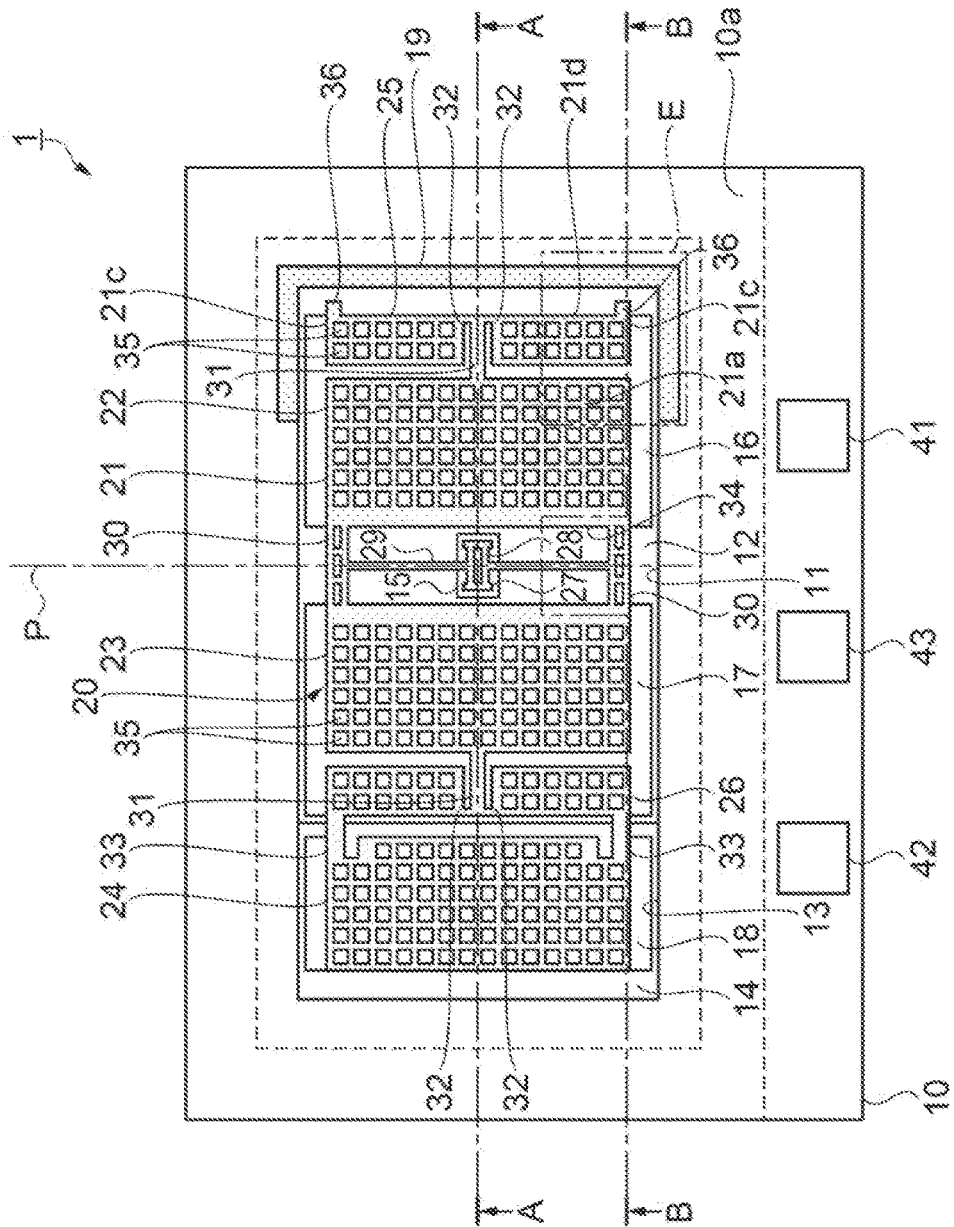
FIG. 1 is a plan view showing a schematic structure of an inertial sensor according to a first embodiment.
Figure 1:
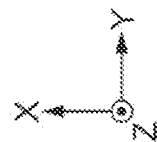

It should be noted that in FIG. 1, for the sake of convenience of explanation of an internal configuration of the inertial sensor 1, there is illustrated a state with a lid 50 removed. Further, in FIG. 1, FIG. 2, and FIG. 3, the illustration of interconnections provided to a substrate 10 is omitted.

Further, for the sake of convenience of explanation, in each of the following plan views, cross-sectional views, and perspective views, an X axis, a Y axis, and a Z axis are shown as three axes perpendicular to each other. Further, a direction along the X axis is referred to as an "X direction," a direction along the Y axis is referred to as a "Y direction," and a direction along the Z axis is referred to as a "Z direction." Further, in each of arrows of the axis directions, a tip side is referred to as a "positive side," a base end side is referred to as a "negative side," and a positive side in the Z direction is referred to as an "upper side," and a negative side in the Z direction is referred to as a "lower side." Further, the Z direction is along the vertical direction, and an X-Y plane is along a horizontal plane. Further, in the present specification, a positive Z direction and a negative Z direction are collectively referred to as the Z direction.

Figure 2:
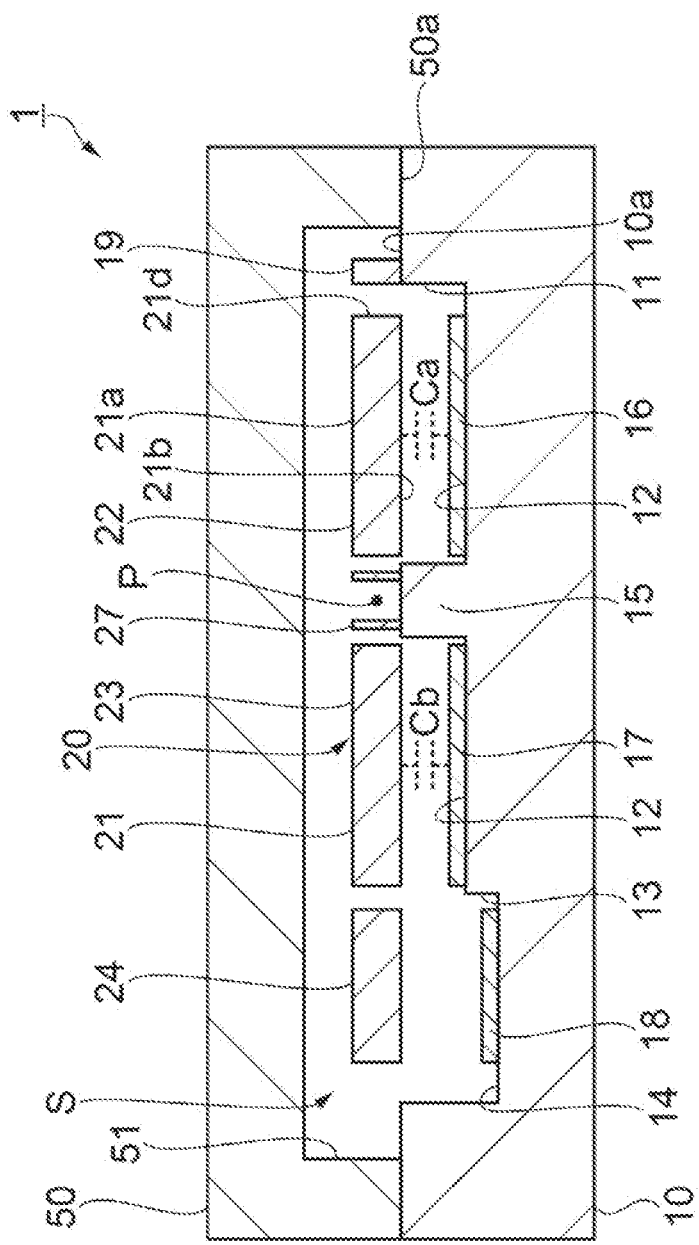
FIG. 2 is a cross-sectional view along the line A-A in FIG. 1.

The inertial sensor 1 shown in FIG. 1 and FIG. 2 is capable of detecting the acceleration in the Z direction as the vertical direction of a sensor element 20 as a physical quantity. Such an inertial sensor 1 has the substrate 10, the sensor element 20 and a limiter 19 each disposed on the substrate 10, and a lid 50 which is bonded to the substrate 10 to cover the sensor element 20 and the limiter 19.

As shown in FIG. 1, the substrate 10 has spread in the X direction and the Y direction, and a dimension in the Z direction of the substrate 10 is defined as a thickness. Further, as shown in FIG. 2, the substrate 10 is provided with a first recess 11 recessed downward from an upper surface 10a of the substrate 10, and a second recess 13 recessed downward from a first bottom surface 12 of the first recess 11. The first recess 11 and the second recess 13 include the sensor element 20 inside, and are formed larger in size than the sensor element 20 in a plan view from the Z direction. The first recess 11 and the second recess 13 function as a runout for oscillating the sensor element 20. Further, the substrate 10 has a support 15 which protrudes from the first bottom surface 12 of the first recess 11 toward the sensor element 20, and the sensor element 20 is bonded and thus fixed on the support 15. Thus, it is possible to fix the sensor element 20 to the substrate 10 in a state of being separated from the first bottom surface 12 of the first recess 11 and a second bottom surface 14 of the second recess 13.

Further, a first stationary electrode 16 and a second stationary electrode 17 are disposed on the first bottom surface 12 of the first recess 11, and a third stationary electrode 18 to be a dummy electrode is disposed on the second bottom surface 14 of the second recess 13. The first stationary electrode 16 and the second stationary electrode 17 have the respective areas substantially equal to each other. Further, the first stationary electrode 16 and the second stationary electrode 17 are respectively coupled to QV amplifiers as external devices not shown, and a capacitance difference therebetween is detected as an electrical signal using a differential detection method. Therefore, it is desirable for the first stationary electrode 16 and the second stationary electrode 17 to be substantially equal in area to each other.

Further, on the upper surface 10a of the substrate in an area where the first recess 11 and the second recess 13 are not disposed, there are disposed coupling terminals 41, 42, and 43 for electrically coupling an external device and the first through third stationary electrodes 16, 17, and 18 to each other. The coupling terminal 41 is electrically coupled to the first stationary electrode 16 with an interconnection not shown, the coupling terminal 42 is electrically coupled to the second stationary electrode 17 with an interconnection not shown, and the coupling terminal 43 is electrically coupled to the third stationary electrode 18 and a movable body 21 with interconnections not shown.

As the substrate 10, it is possible to use a glass substrate formed of a glass material including alkali metal ions as movable ions such as Na+, such as borosilicate glass such as Pyrex (registered trademark) glass or Tempax (registered trademark) glass. It should be noted that the substrate 10 is not particularly limited, and it is also possible to use, for example, a silicon substrate or a quartz substrate.

Further, as the first through third stationary electrodes 16, 17, and 18, there can be used metal such as Au, Pt, Ag, Cu, or Al.

As shown in FIG. 2, the lid 50 is formed at a position where a recess 51 recessed upward thereof overlaps the first recess 11 and the second recess 13 of the substrate 10. The lid 50 is bonded on the substrate 10 housing the sensor element 20 in the recess 51. Further, the lid 50 and the substrate 10 form an internal space S for housing the sensor element 20 inside.

It is preferable for the internal space S to be a gastight space filled with an inert gas such as nitrogen, helium, or argon, and provided with substantially atmospheric pressure at the operating temperature in a range of about −40° C. through 125° C. It should be noted that the atmosphere in the internal space S is not particularly limited, but can be, for example, in a reduced-pressure state, or can also be in a pressurized state.

As the lid 50, there can be used, for example, a silicon substrate. It should be noted that this is not a limitation, and it is also possible to use, for example, a glass substrate or a quartz substrate. Further, the bonding method of the substrate 10 and the lid 50 is not particularly limited, but can arbitrarily be selected in accordance with the materials of the substrate 10 and the lid 50, and there can be used, for example, anodic bonding, activation bonding for bonding the bonding surfaces activated by irradiation with plasma to each other, bonding with a bonding material such as glass frit, and metal eutectic bonding for bonding metal films deposited on the upper surface 10a of the substrate 10 and a lower surface 50a of the lid 50 to each other.

The sensor element 20 is formed by vertically processing a silicon substrate doped with impurity such as phosphorus (P), boron (B), or arsenic (As) to have electrical conductivity, using an etching process, in particular a Bosch process as a deep reactive ion etching technology.

As shown in FIG. 1, the sensor element 20 has two fixators 27 bonded and fixed on the support 15, two support beams 28 for coupling the two fixators 27, a suspension 29 extending toward the positive X direction from one of the support beams 28, a suspension 29 extending toward the negative X direction from the other of the support beams 28, and the movable body 21 coupled to the two suspensions 29 via a first coupler 30. The movable body 21 is displaceable in a predetermined direction with respect to the fixators 27, and when the acceleration along the Z direction acts thereon, the movable body 21 oscillates around an oscillation axis P along the X axis taking the suspensions 29 as the oscillation axis P while flexurally deforming the suspensions 29. In other words, there is adopted a configuration in which the movable body 21 can make a seesaw oscillation with respect to the fixators 27 taking the oscillation axis P as a central axis.

The movable body 21 has two planes 21a, 21b opposed to each other, and side surfaces 21c, 21d connecting the two planes 21a, 21b to form a rectangular shape having long sides in the Y direction in the plan view from the Z direction. Further, the movable body 21 has a first movable electrode 22 located at the positive side in the Y direction with respect to the oscillation axis P, a second movable electrode 23 located at the negative side in the Y direction with respect to the oscillation axis P, and a third movable electrode 24 to be coupled to the second movable electrode 23. The first movable electrode 22, the second movable electrode 23, and the third movable electrode 24 are disposed so as to respectively overlap the first stationary electrode 16, the second stationary electrode 17, and the third stationary electrode 18 disposed on the first bottom surface 12 of the substrate 10 in the plan view from the Z direction.

Further, the movable body 21 located at the negative side in the Y direction with respect to the oscillation axis P is configured longer in Y direction than the first movable electrode 22 as the movable body 21 located at the positive side in the Y direction with respect to the oscillation axis P since the second movable electrode 23 and the third movable electrode 24 are coupled to each other. Therefore, the movable body 21 located at the negative side in the Y direction with respect to the oscillation axis P becomes larger in area than the movable body 21 located at the positive side in the Y direction with respect to the oscillation axis P in the plan view from the Z direction, and thus, becomes greater in mass, and is therefore higher in rotational moment when the acceleration is applied than the movable body 21 located at the positive side in the Y direction. Due to the difference in rotational moment, the movable body 21 makes the seesaw oscillation around the oscillation axis P when the acceleration in the Z direction is applied. It should be noted that the seesaw oscillation means that the second movable electrode 23 is displaced toward the negative Z direction when the first movable electrode 22 is displaced toward the positive Z direction, and on the contrary, when the first movable electrode 22 is displaced toward the negative Z direction, the second movable electrode 23 is displaced toward the positive Z direction.

When driving the inertial sensor 1, since the drive signal is applied to the sensor element 20, a capacitance Ca is formed between the first movable electrode 22 and the first stationary electrode 16. Similarly, a capacitance Cb is formed between the second movable electrode 23 and the second stationary electrode 17. The capacitances Ca, Cb are substantially equal to each other in a natural state in which no acceleration is applied.

When the acceleration in the Z direction is applied to the inertial sensor 1, the movable body 21 makes the seesaw oscillation centering on the oscillation axis P. Due to the seesaw oscillation of the movable body 21, a gap between the first movable electrode 22 and the first stationary electrode 16 and a gap between the second movable electrode 23 and the second stationary electrode 17 vary in reversed phase with each other, and accordingly, the capacitances Ca, Cb vary in reversed phase with each other. Therefore, it is possible for the inertial sensor 1 to detect the acceleration in the Z direction based on the difference in capacitance value between the capacitances Ca, Cb.

Further, the movable body 21 has an opening 34 between the first movable electrode 22 and the second movable electrode 23, and the fixators 27, the support beams 28, and the suspensions 29 are disposed in the opening 34. By adopting such a shape, reduction in size of the sensor element 20 can be achieved. Further, the first through third movable electrodes 22, 23, and 24 and resilient portions 25, 26 of the movable body 21 are provided with a plurality of through holes 35 penetrating the two planes 21a, 21b. Therefore, it is possible to reduce a resistance to air generated when the movable body 21 is displaced in the Z direction.

The first movable electrode 22 has a second coupler 31 extending from the center of an end portion at the positive side in the Y direction with respect to the oscillation axis P toward the positive Y direction, and to a tip portion of the second coupler 31, there are coupled the resilient portions 25 respectively at the positive side and the negative side in the X direction of the second coupler 31 via a third coupler 32. The resilient portions 25 are disposed in portions opposed to the limiter 19, and are configured so as to be able to rotationally be displaced in an in-plane direction of the planes 21a, 21b of the movable body 21 taking the third coupler 32 as an axis. Therefore, even when an excessive rotational displacement in the in-plane direction is caused by an intensive impact from the outside or the like, and the side surface 21c which is opposed to the limiter 19 for the resilient portions 25 and is perpendicular to the X direction collides with the limiter 19, the impact due to the collision can be weakened by using the resilient function in which the resilient portion 25 deforms, and it is possible to suppress the sticking phenomenon called stiction between the movable body 21 and the limiter 19.

Figure 3:
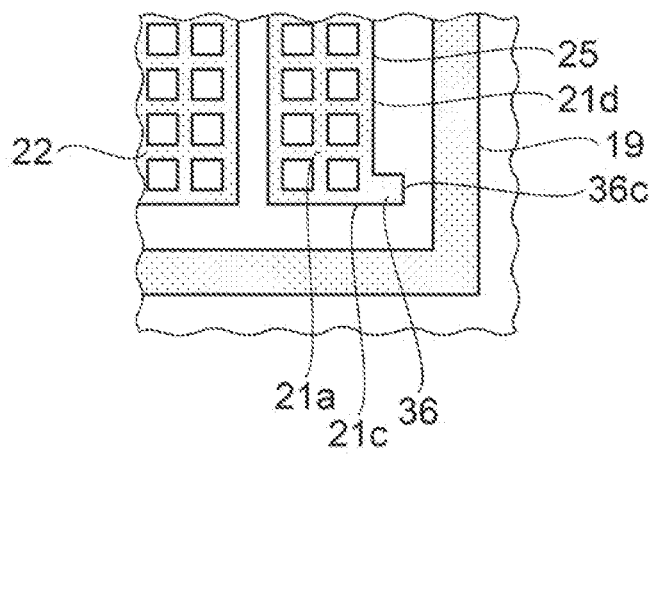
FIG. 3 is an enlarged plan view of an E part in FIG. 1.
Figure 4:
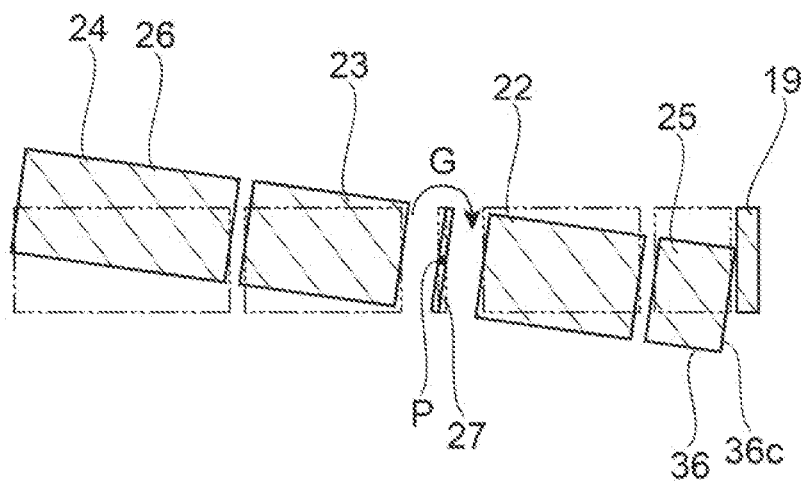
FIG. 4 is a cross-sectional view along the B-B line in FIG. 1, and explains an operation of the inertial sensor.

Further, as shown in FIG. 3, the side surface 21d which is opposed to the limiter 19 for the resilient portions 25, and is perpendicular to the Y direction is provided with protrusions 36 protruding in the Y direction. The protrusions 36 are respectively disposed, on the side surface 21d, in an end portion at the positive X direction side of the resilient portion 25 coupled to the positive side in the X direction of the second coupler 31 and an end portion at the negative X direction side of the resilient portion 25 coupled to the negative side in the X direction of the second coupler 31, and are configured so as to be able to rotationally be displaced in the Z direction as a perpendicular direction to the planes 21a, 21b of the movable body 21 taking the third coupler 32 as an axis. Therefore, when the excessive acceleration in the Z direction is applied, as shown in FIG. 4, even when a rotational displacement occurs around the oscillation axis P represented by an arrow G, and abutment surfaces 36c opposed to the limiter 19 of the protrusions 36 collide with the limiter 19, the impact due to the collision can be weakened by the resilient function in which the resilient portion 25 deforms, and it is possible to suppress the sticking phenomenon between the movable body 21 and the limiter 19.

The second movable electrode 23 has a second coupler 31 extending from the center of an end portion at the negative side in the Y direction with respect to the oscillation axis P toward the negative Y direction, and to the second coupler 31, there are coupled resilient portions 26 respectively at the positive side and the negative side in the X direction of the second coupler 31 via the third coupler 32. The third movable electrode 24 is coupled to an end portion at the positive X direction side of the resilient portion 26 coupled to the positive side in the X direction of the second coupler 31, and an end portion at the negative X direction side of the resilient portion 26 coupled to the negative side in the X direction of the second coupler 31 via a fourth coupler 33.

The limiter 19 is disposed for limiting the rotational displacement in the in-plane direction of the planes 21a, 21b of the movable body 21 and the rotational displacement around the oscillation axis P, and is bonded to be fixed to the upper surface 10a of the substrate 10 so as to be opposed to the side surfaces 21c, 21d of the movable body 21.

The limiter 19 is formed by etching, in particular, vertically processing with the Bosch process as the deep reactive ion etching technology, the electrically conductive silicon substrate doped with the impurity such as phosphorous (P), boron (B), or arsenic (As) the same as that of the sensor element 20 at the same time as the sensor element 20.

Since the inertial sensor 1 according to the present embodiment is provided with the resilient portions 25 in a portion where the movable body 21 is opposed to the limiter 19, even when an excessive rotational displacement in the in-plane direction is caused by an intensive impact from the outside or the like, and the side surface 21c of the resilient portion 25 collides with the limiter 19, the impact due to the collision can be weakened by using the resilient function in which the resilient portion 25 deforms, and it is possible to suppress the sticking phenomenon between the movable body 21 and the limiter 19.

Further, since the resilient portion 25 is provided with the protrusions 36 protruding in the Y direction, when the excessive acceleration in the Z direction is applied, even when the abutment surfaces 36c opposed to the limiter 19 of the protrusions 36 collide with the limiter 19, the impact due to the collision can be weakened by the resilient function in which the resilient portion 25 deforms, and it is possible to suppress the sticking phenomenon between the movable body 21 and the limiter 19.

Further, since the resilient portion 25 is provided with the through holes 35 penetrating the two planes 21a, 21b, it is possible to reduce the resistance to air generated when the movable body 21 is displaced in the Z direction even in the resilient portion 25, and it is possible to obtain the inertial sensor 1 high in sensitivity.

2. Second Embodiment

Figure 5:
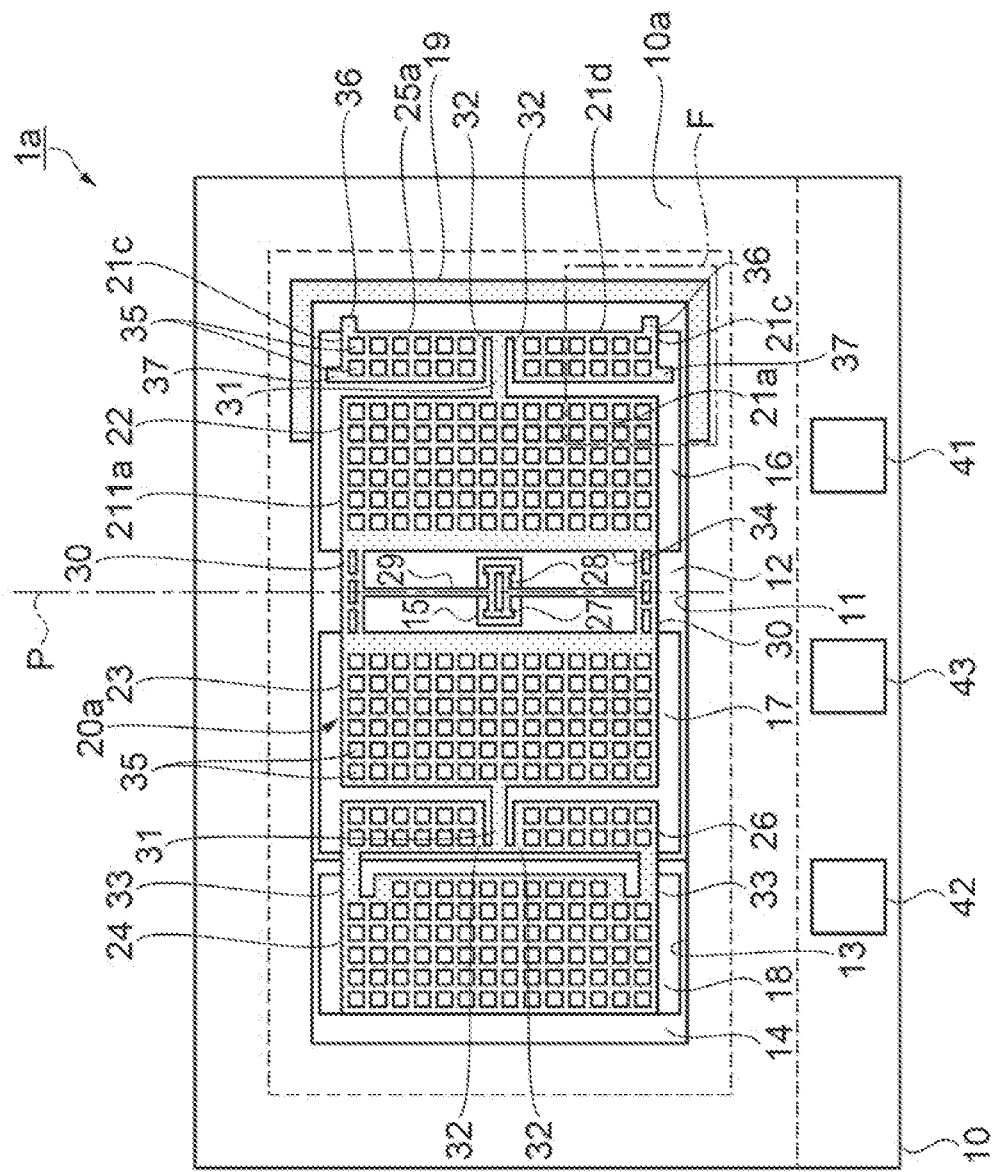
FIG. 5 is a plan view showing a schematic structure of an inertial sensor according to a second embodiment.
Figure 5:
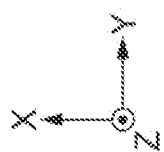

Then, an inertial sensor 1a according to a second embodiment will be described with reference to FIG. 5 and FIG. 6. It should be noted that FIG. 5 illustrates the state in which the lid 50 is removed for the sake of convenience of explanation. Further, in FIG. 5, the illustration of interconnections provided to the substrate 10 is omitted.

Compared to the inertial sensor 1 according to the first embodiment, the inertial sensor 1a according to the present embodiment is substantially the same as the inertial sensor 1 according to the first embodiment except the point that a structure of a resilient portion 25a of a sensor element 20a is different. It should be noted that the description will be presented with a focus on the difference from the first embodiment described above, and the description of substantially the same issues will be omitted.

Figure 6:
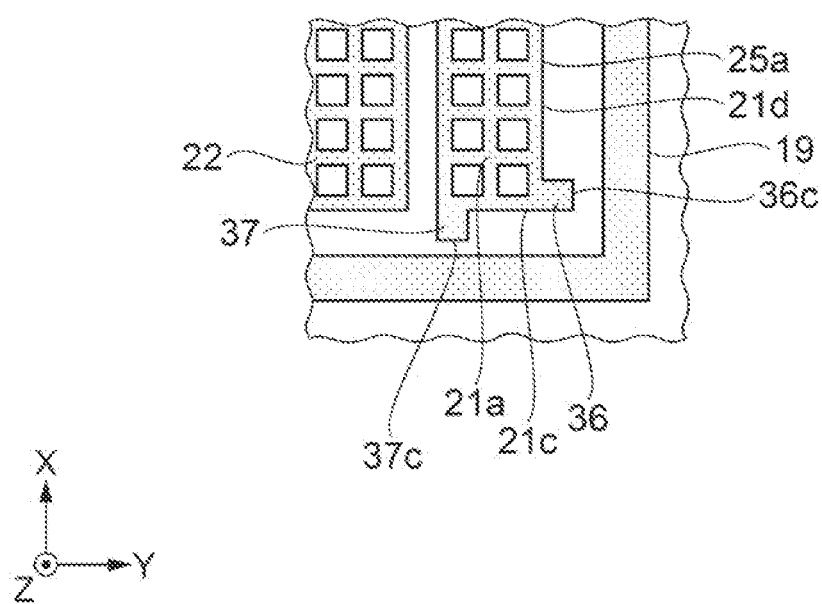
FIG. 6 is an enlarged plan view of an F part in FIG. 5.

As shown in FIG. 5 and FIG. 6, in the inertial sensor 1a, the side surface 21c which is opposed to the limiter 19 for the resilient portion 25a of a movable body 211a, and is perpendicular to the X direction is provided with protrusions 37 protruding in the X direction. Further, the protrusions 37 are disposed respectively on the side surface 21c opposed to the limiter 19 for the resilient portion 25a coupled at the positive side in the X direction of the second coupler 31, and the side surface 21c opposed to the limiter 19 for the resilient portion 25a coupled at the negative side in the X direction of the second coupler 31.

By an abutment surface 37c opposed to the limiter 19 of the protrusion 37 and the limiter 19 making contact with each other, the protrusion 37 is capable of improving the impact resistance due to the resilient function of the resilient portion 25a with respect also to the impact in the X direction.

By adopting such a configuration, it is possible to improve the impact resistance with respect also to the excessive impact in the X direction, and thus, it is possible to obtain substantially equivalent advantages to those of the inertial sensor 1 according to the first embodiment.

3. Third Embodiment

Figure 7:
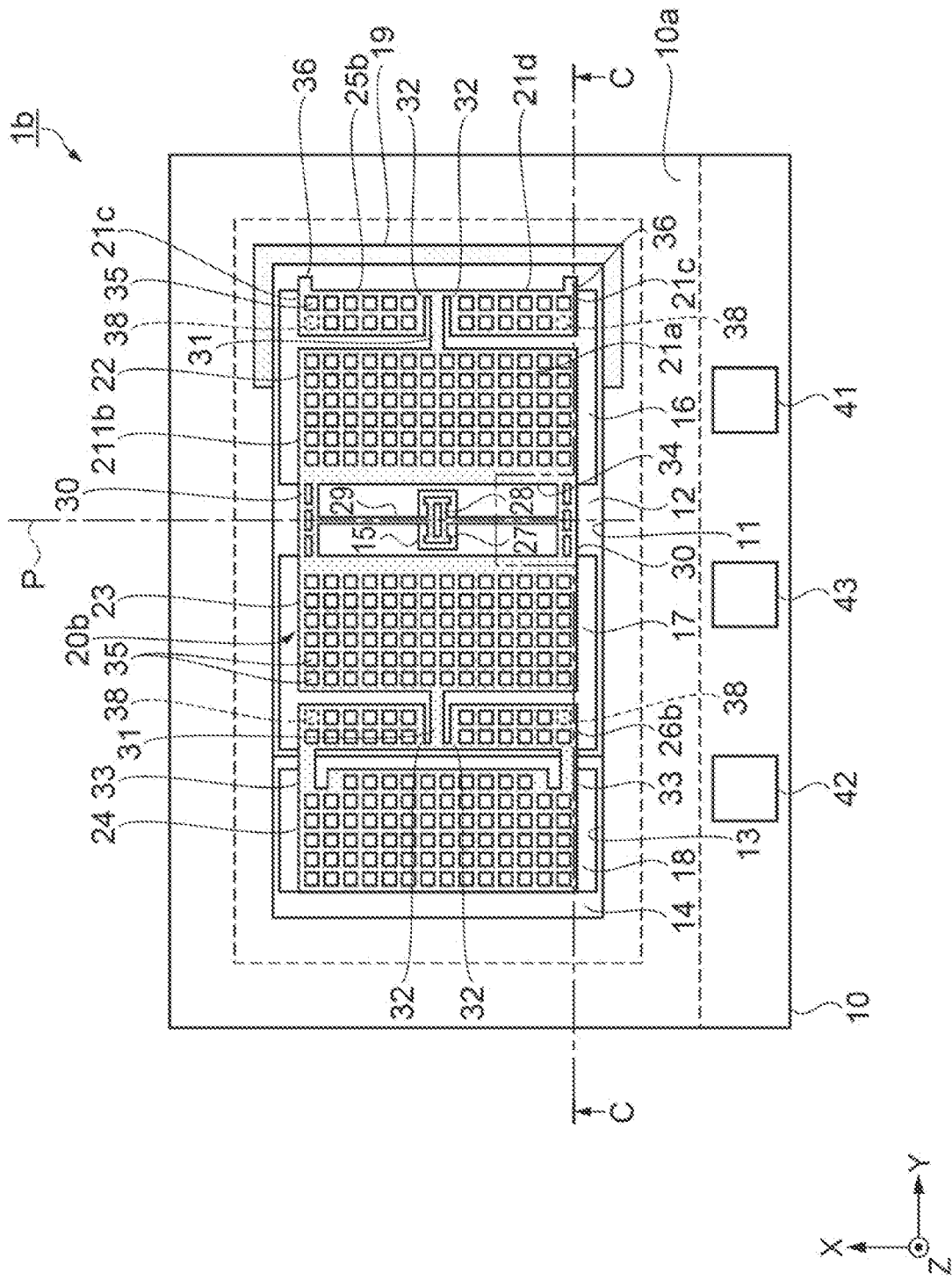
FIG. 7 is a plan view showing a schematic structure of an inertial sensor according to a third embodiment.

Then, an inertial sensor 1b according to a third embodiment will be described with reference to FIG. 7 and FIG. 8. It should be noted that FIG. 7 illustrates the state in which the lid 50 is removed for the sake of convenience of explanation. Further, in FIG. 7 and FIG. 8, the illustration of interconnections provided to the substrate 10 is omitted.

Compared to the inertial sensor 1 according to the first embodiment, the inertial sensor 1b according to the present embodiment is substantially the same as the inertial sensor 1 according to the first embodiment except the point that a structure of resilient portions 25b, 26b of a sensor element 20b is different. It should be noted that the description will be presented with a focus on the difference from the first embodiment described above, and the description of substantially the same issues will be omitted.

Figure 8:
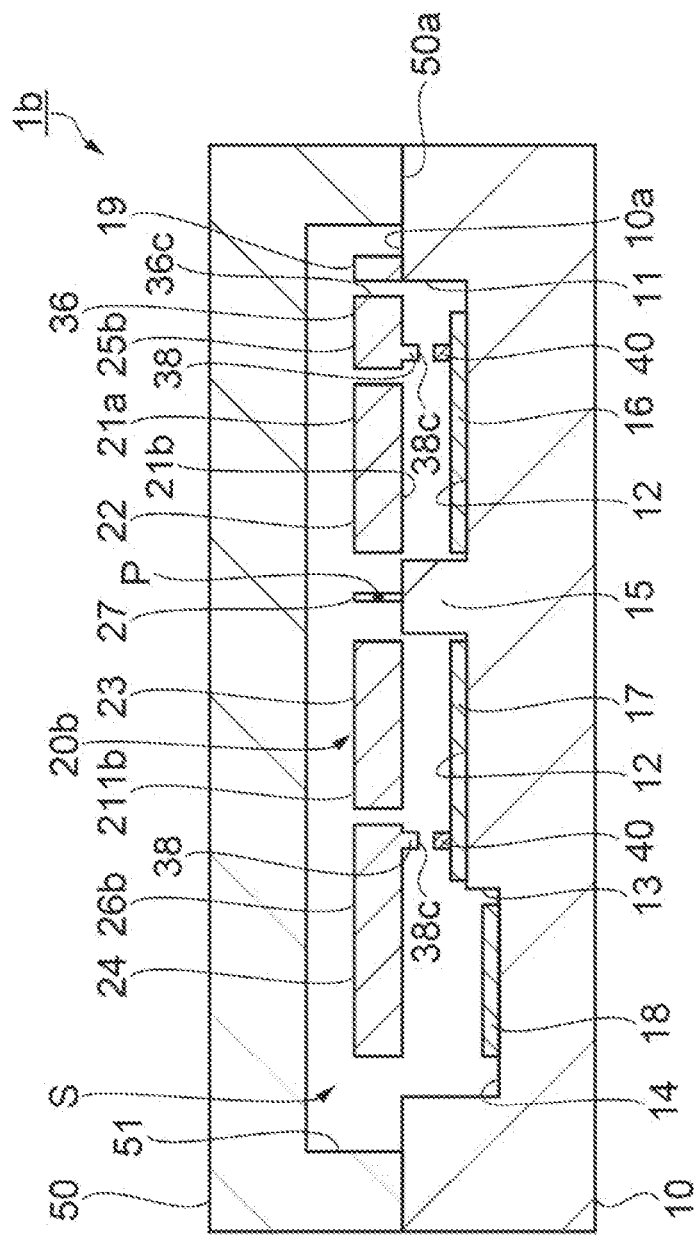
FIG. 8 is a cross-sectional view along the line C-C in FIG. 7.
Figure 8:
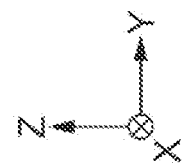

As shown in FIG. 7 and FIG. 8, in the inertial sensor 1b, the plane 21b opposed to the first stationary electrode 16 of the resilient portion 25b of a movable body 211b is provided with protrusions 38 protruding in the Z direction. Further, the protrusions 38 are disposed respectively at a position along the Y direction with the through hole 35 the closest to the limiter 19 for the resilient portion 25b coupled at the positive side in the X direction of the second coupler 31, and a position along the Y direction with the through hole 35 the closest to the limiter 19 for the resilient portion 25b coupled at the negative side in the X direction of the second coupler 31. Further, the protrusions 38 are also disposed on the plane 21b opposed to the second stationary electrode 17 of the resilient portion 26b.

On the first stationary electrode 16, there is formed an insulating film 40 for preventing short circuit between the first stationary electrode 16 and the first movable electrode 22 at positions opposed to the protrusions 38 of the resilient portions 25b. Further, on the second stationary electrode 17, there is formed an insulating film 40 for preventing short circuit between the second stationary electrode 17 and the second movable electrode 23 at positions opposed to the protrusions 38 of the resilient portions 26b.

By abutment surfaces 38c of the protrusions 38 provided to the resilient portions 25b, 26b and the insulating film 40 making contact with each other, it is possible to improve the impact resistance due to the resilient function of the resilient portions 25b, 26b with respect also to the impact in the Z direction.

By adopting such a configuration, it is possible to further improve the impact resistance together with the protrusions 36 provided to the resilient portions 25b with respect also to the excessive impact in the Z direction, and thus, it is possible to obtain substantially equivalent advantages to those of the inertial sensor 1 according to the first embodiment.

4. Fourth Embodiment

Then, an inertial sensor 1c according to a fourth embodiment will be described with reference to FIG. 9. It should be noted that FIG. 9 is a cross-sectional view of a portion corresponding to a position of a line A-A in FIG. 1, and an illustration of interconnections provided to a substrate 100 is omitted.

Compared to the inertial sensor 1 according to the first embodiment, the inertial sensor 1c according to the present embodiment is substantially the same as the inertial sensor 1 according to the first embodiment except the point that a structure of the substrate 100 for fixing the sensor element 20, the limiter 19, and the lid 50 is different. It should be noted that the description will be presented with a focus on the difference from the first embodiment described above, and the description of substantially the same issues will be omitted.

Figure 9:
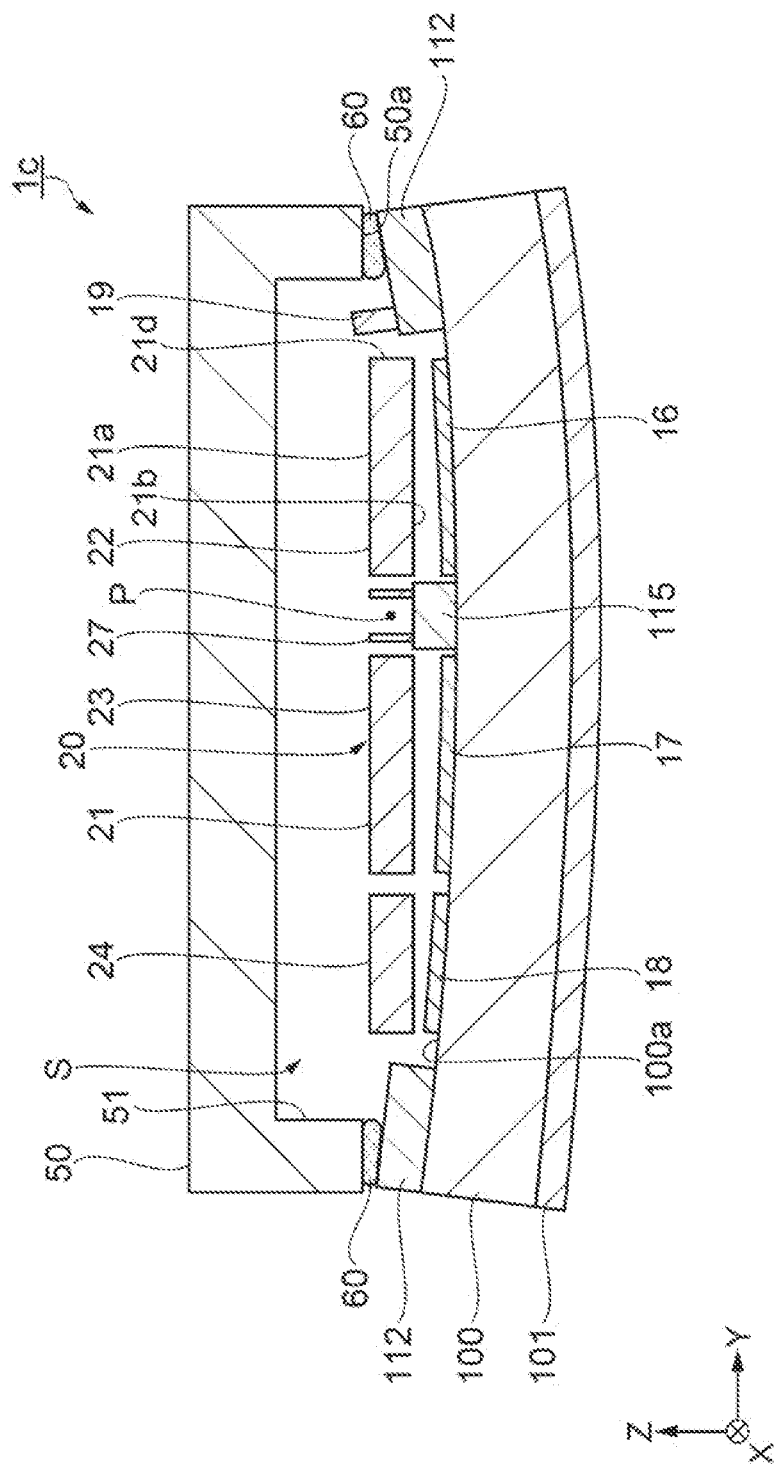
FIG. 9 is a cross-sectional view showing a schematic structure of an inertial sensor according to a fourth embodiment.

As shown in FIG. 9, the inertial sensor 1c has the substrate 100 warped toward the sensor element 20 to form a concave shape. The substrate 100 is formed of the silicon substrate, and has an oxide film 101 generated by thermally oxidizing the silicon substrate. The oxide film 101 as silicon oxide ($SiO_2$) is arranged on a surface at an opposite side of an upper surface 100a opposed to the movable body 21 of the substrate 100. It should be noted that the warp of the substrate 100 is caused by a residual stress of the oxide film 101 formed only on one surface of the silicon substrate.

Due to the warp of the substrate 100, the limiter 19 which is bonded to be fixed to a frame 112 formed on the upper surface 100a of the substrate 100 tilts toward the side surface 21d of the movable body 21, and thus, it is possible to narrow a distance between the side surface 21d and the limiter 19. Therefore, by warping the substrate 100, it is possible to easily manufacture the inertial sensor 1c narrow in distance between the movable body 21 and the limiter 19.

By adopting such a configuration, it is possible to obtain the inertial sensor 1c narrow in distance between the movable body 21 and the limiter 19, and thus, it is possible to obtain substantially equivalent advantages to those of the inertial sensor 1 according to the first embodiment.

Then, a method of manufacturing the inertial sensor 1c according to the fourth embodiment will be described with reference to FIG. 10 through FIG. 17.

Figure 10:
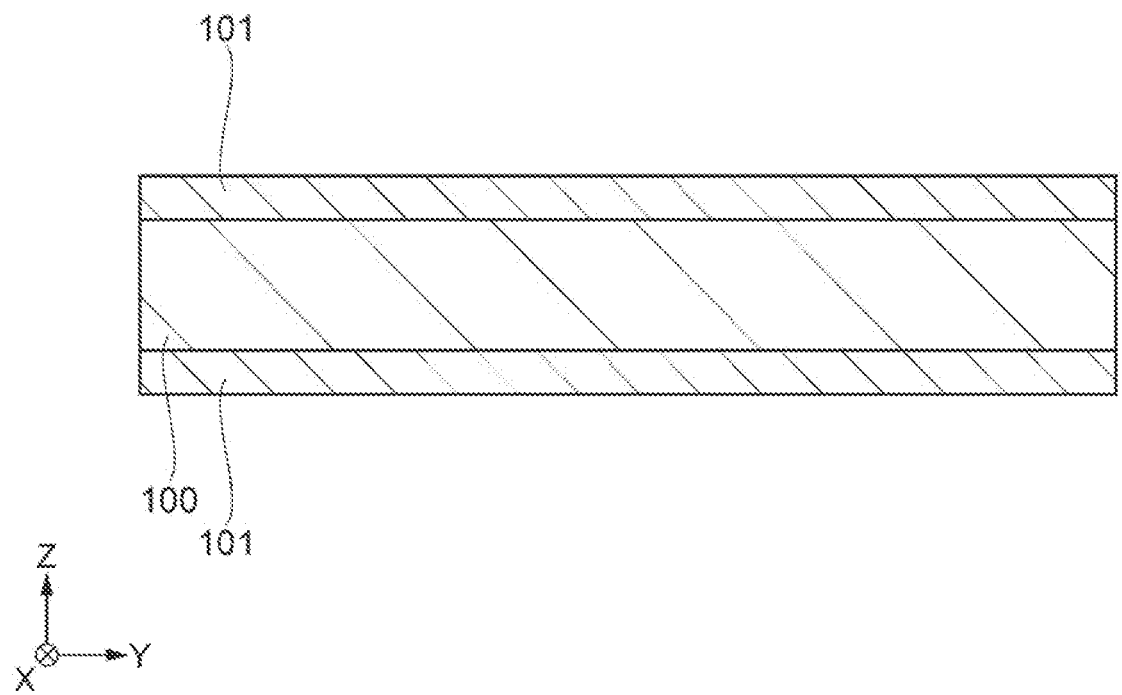
FIG. 10 is a cross-sectional view showing a manufacturing method of the inertial sensor.

First, the substrate 100 formed of the silicon substrate is thermally oxidized, and as shown in FIG. 10, the oxide film 101 as silicon oxide ($SiO_2$) is formed on both of upper and lower surfaces of the substrate 100.

Figure 11:
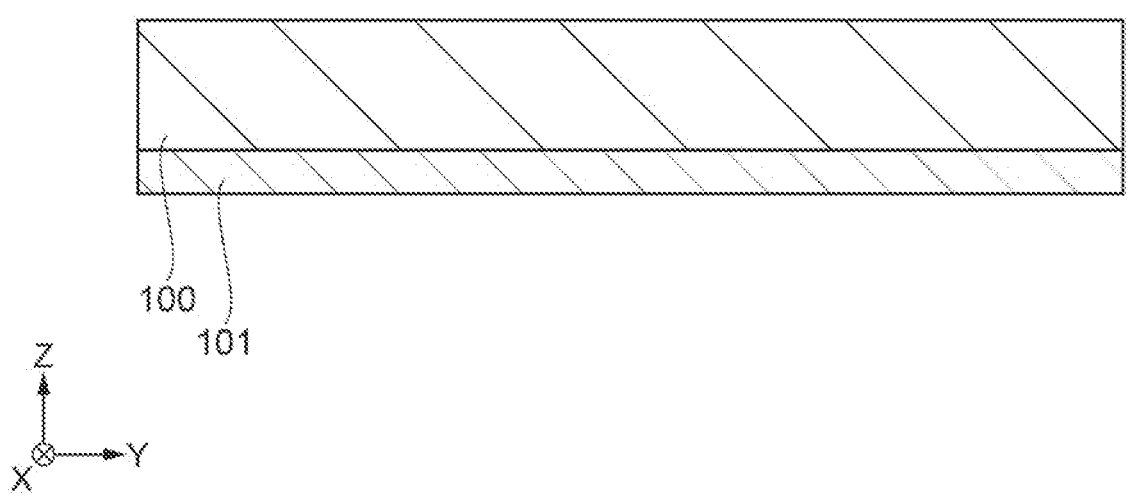
FIG. 11 is a cross-sectional view showing the manufacturing method of the inertial sensor.

Then, as shown in FIG. 11, the oxide film 101 formed on either one of the upper and lower surfaces of the substrate 100 is removed by etching or the like.

Figure 12:
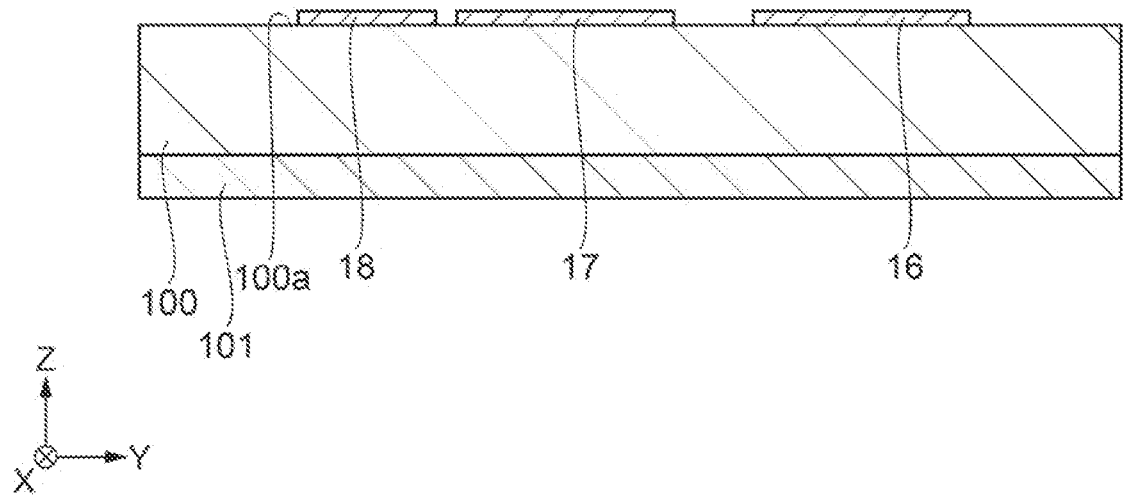
FIG. 12 is a cross-sectional view showing the manufacturing method of the inertial sensor.

Then, as shown in FIG. 12, the first through third stationary electrodes 16, 17, and 18 and the interconnections not shown are formed on the upper surface 100a where the oxide film 101 has been removed, using the photolithography technology.

Figure 13:
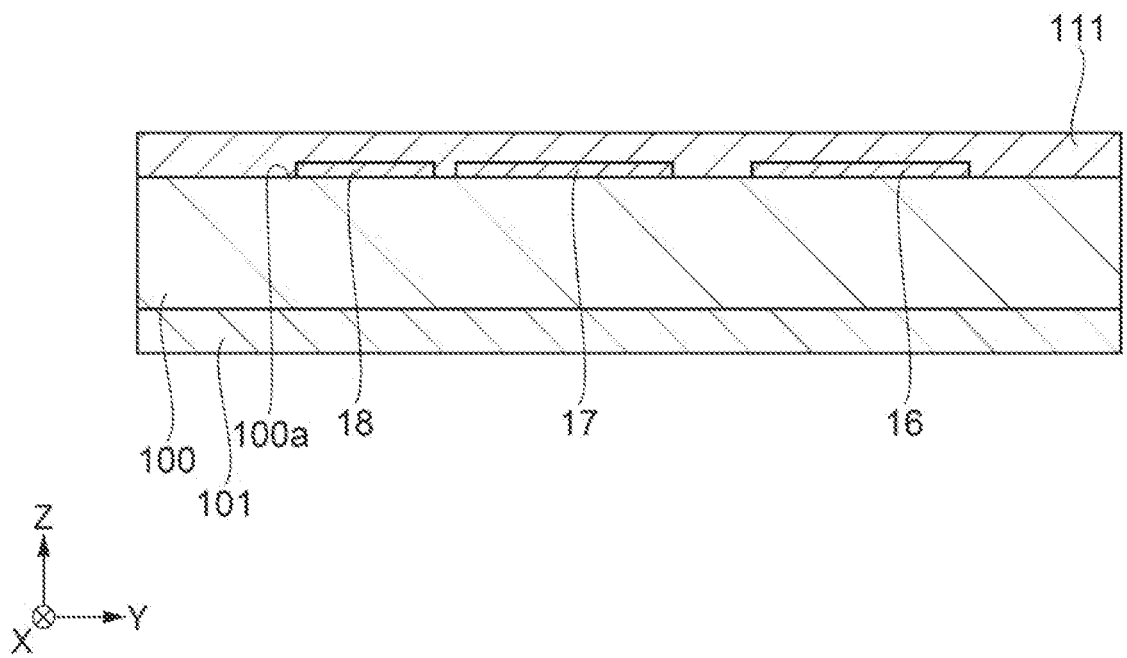
FIG. 13 is a cross-sectional view showing the manufacturing method of the inertial sensor.

Then, as shown in FIG. 13, an oxide film 111 of silicon oxide ($SiO_2$) to be a sacrifice layer is formed on the upper surface 100a of the substrate 100 where the first through third stationary electrodes 16, 17, and 18 have been formed, using a CVD device and so on.

Figure 14:
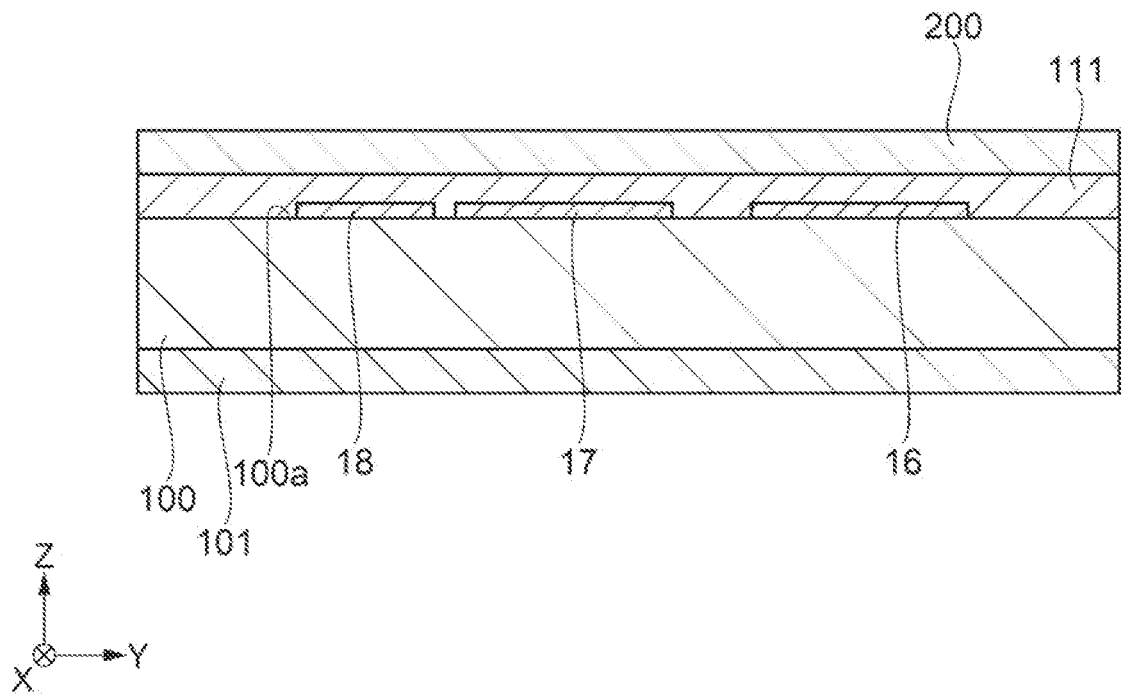
FIG. 14 is a cross-sectional view showing the manufacturing method of the inertial sensor.

Then, as shown in FIG. 14, a structure film 200 of silicon (Si) for forming the movable body 21 and the limiter 19 is formed on the oxide film 111 using the CVD device and so on. Subsequently, impurities such as phosphorous (P), boron (B), or arsenic (As) are doped to form the structure film 200 having the electrical conductivity.

Figure 15:
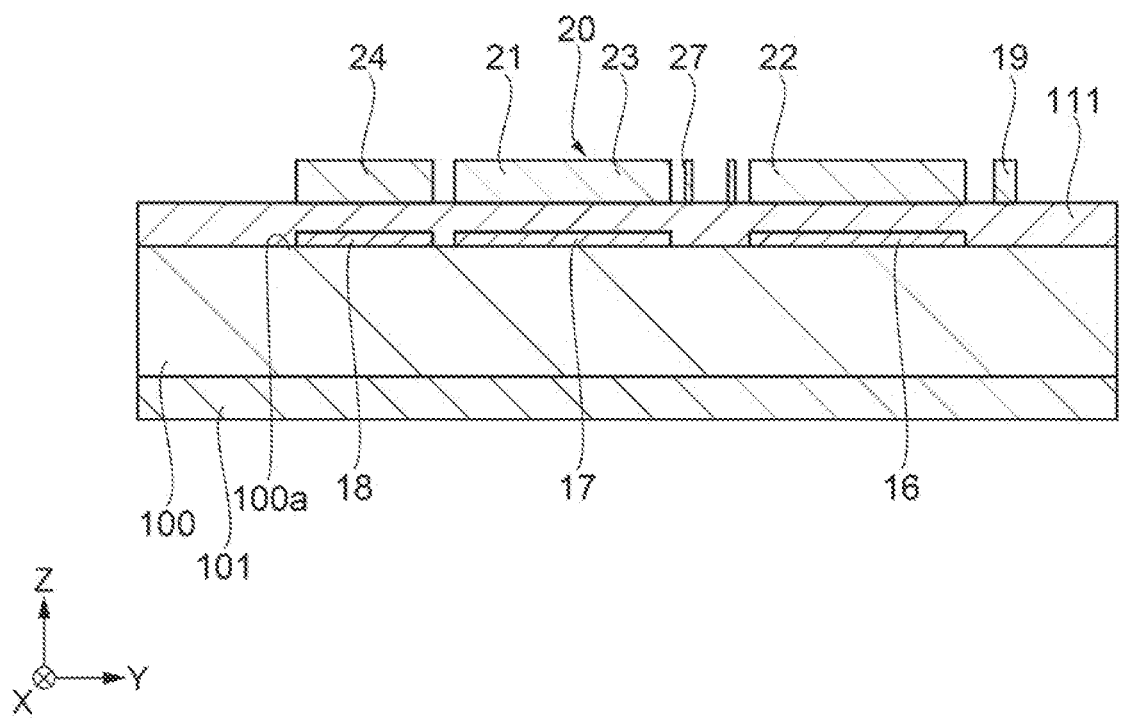
FIG. 15 is a cross-sectional view showing the manufacturing method of the inertial sensor.

Then, the structure film 200 is processed using the photolithography technology to form the movable body 21 including the first through third movable electrodes 22, 23, and 24, the fixators 27, and so on, and the limiter 19 as shown in FIG. 15.

Figure 16:
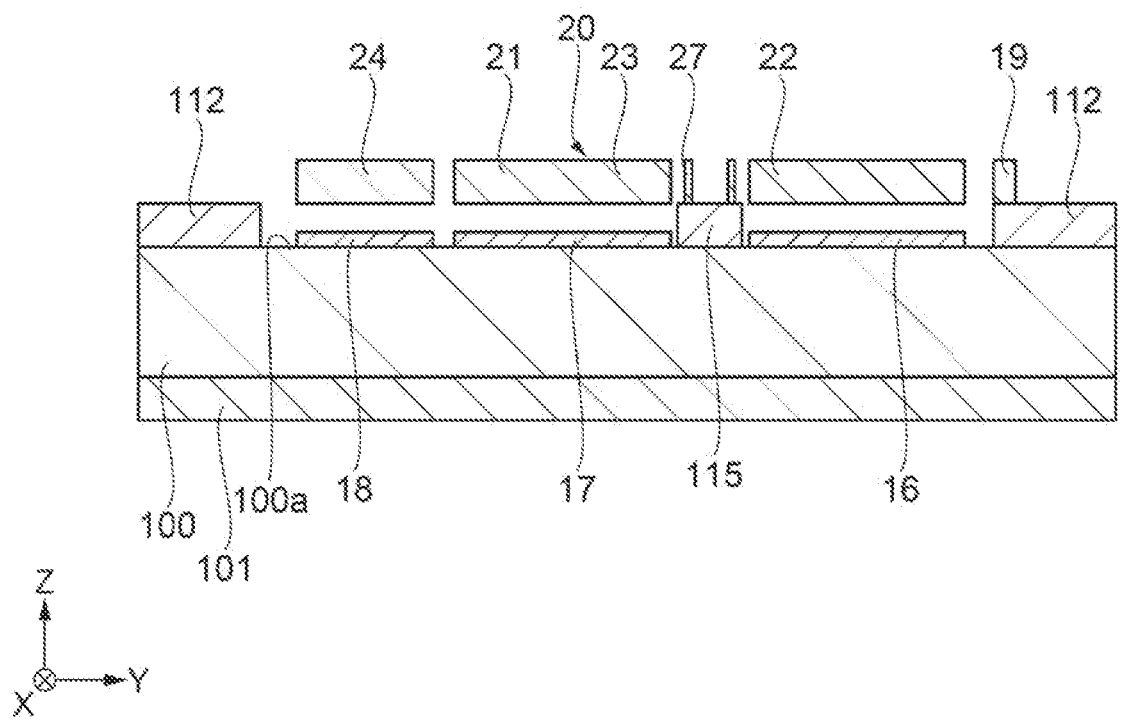
FIG. 16 is a cross-sectional view showing the manufacturing method of the inertial sensor.

Then, the oxide film 111 except a support 115 to which the fixators 27 are bonded to be fixed and the frame 112 to which the limiter 19 is bonded to be fixed, and which incorporates the sensor element 20 inside is etched to be removed using the photolithography technology as shown in FIG. 16.

Figure 17:
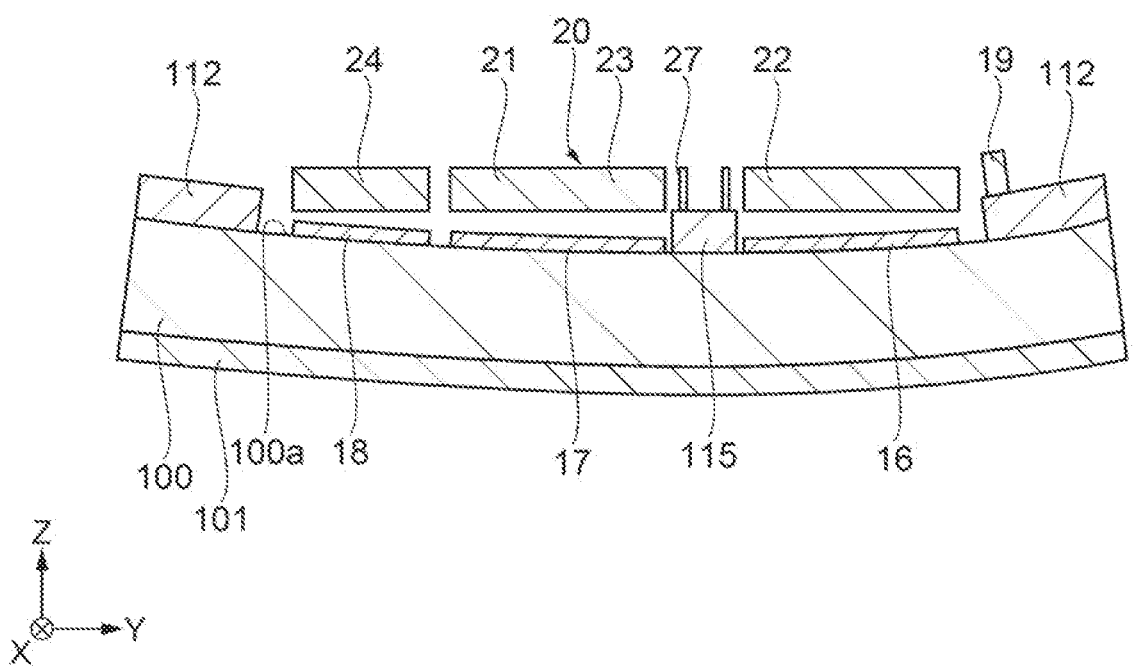
FIG. 17 is a cross-sectional view showing the manufacturing method of the inertial sensor.

Then, by partially removing the oxide film 111, the substrate 100 provided with the movable body 21 and the limiter 19 warps toward the sensor element 20 to form the concave shape as shown in FIG. 17 due to the residual stress of the oxide film 101 formed on the surface of the substrate 100 at the opposite side to the upper surface 100a.

Subsequently, by bonding the lid 50 on the frame 112 provided to the substrate 100 using a bonding member 60, it is possible to manufacture the inertial sensor 1c in which the substrate 100 warps toward the sensor element 20 to narrow the distance between the movable body 21 and the limiter 19 as shown in FIG. 9.

It should be noted that the manufacturing method is not limited to the above description, and it is possible to adopt a method of partially removing the oxide film 101 formed on either one of the upper and lower surfaces of the substrate 100 by etching or the like to make film thickness of the oxide film 101 different between the upper and lower surfaces. Further, the film to be deposited on the substrate 100 is not limited to the oxide film, and it is possible to adopt a method of depositing a silicon nitride film ($Si_3N_4$) using the CVD device or the like.

5. Fifth Embodiment

Figure 18:
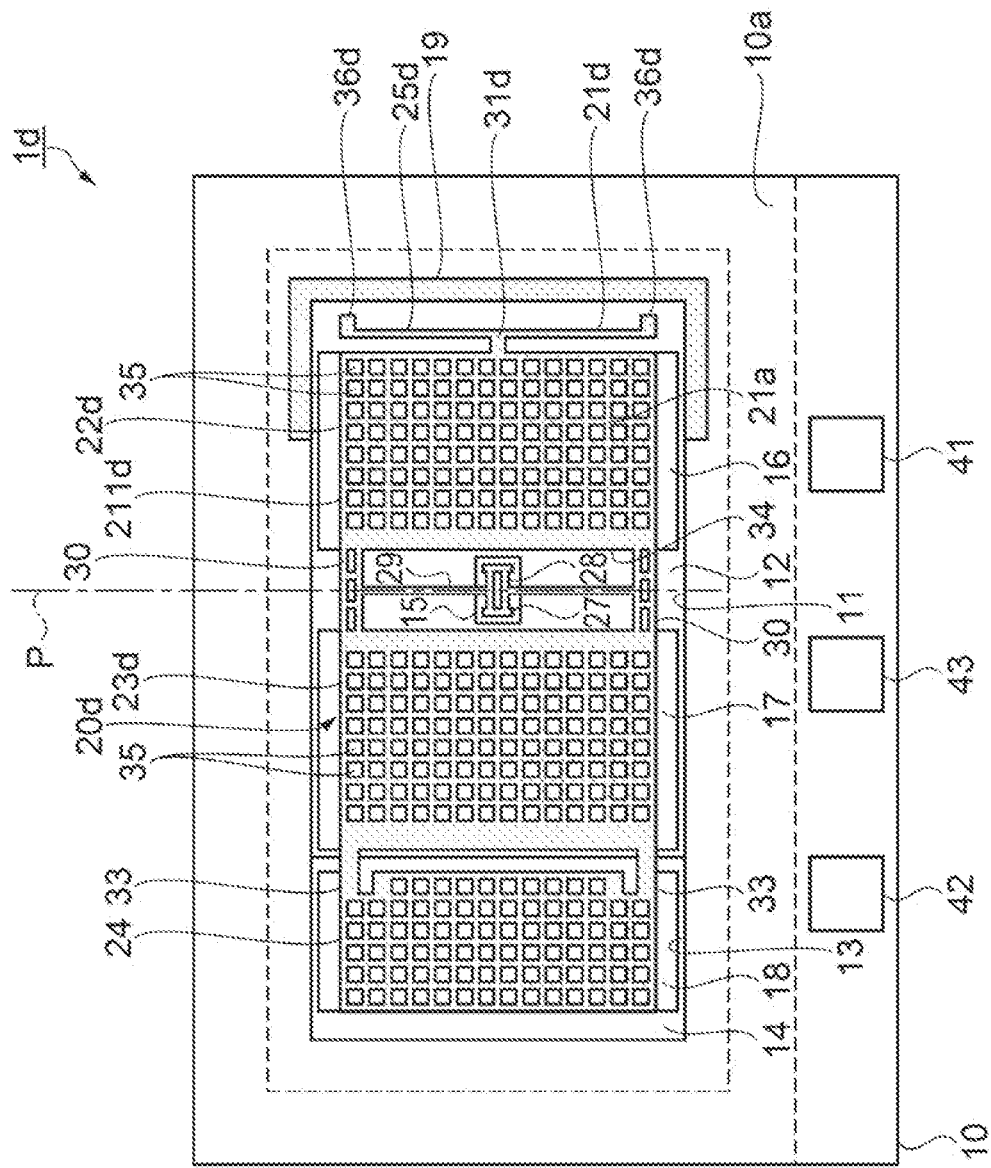
FIG. 18 is a plan view showing a schematic structure of an inertial sensor according to a fifth embodiment.

Then, an inertial sensor 1d according to a fifth embodiment will be described with reference to FIG. 18. It should be noted that FIG. 18 illustrates the state in which the lid 50 is removed for the sake of convenience of explanation. Further, in FIG. 18, the illustration of interconnections provided to the substrate 10 is omitted.

Compared to the inertial sensor 1 according to the first embodiment, the inertial sensor 1d according to the present embodiment is substantially the same as the inertial sensor 1 according to the first embodiment except the point that a structure of a first movable electrode 22d, a second movable electrode 23d, and resilient portions 25d of a sensor element 20d is different. It should be noted that the description will be presented with a focus on the difference from the first embodiment described above, and the description of substantially the same issues will be omitted.

As shown in FIG. 18, in the inertial sensor 1d, the resilient portions 25d extending respectively toward the positive X direction and the negative X direction are provided to the first movable electrode 22d of a movable body 211d, and in the resilient portions 25d, protrusions 36d protruding in the Y direction are disposed on the side surface 21d opposed to the limiter 19 and perpendicular to the Y direction. It should be noted that the resilient portions 25d are coupled to a tip of a second coupler 31d which extends toward the positive Y direction from the center of an end portion at the positive side in the Y direction with respect to the oscillation axis P of the first movable electrode 22d. Therefore, the resilient portions 25d are configured so as to be able to rotationally be displaced in the in-plane direction of the planes 21a, 21b of the movable body 211d taking the tip of the second coupler 31d as an axis, and at the same time, so as to be able to rotationally be displaced in the Z direction as a perpendicular direction to the planes 21a, 21b of the movable body 211d.

Further, the second movable electrode 23d is coupled to the third movable electrode 24 in the end portion at the negative Y direction side via the fourth coupler 33.

It should be noted that the resilient portions 25d have a cantilever structure, and are therefore high in resonance frequency of a resilient function portion. Therefore, it is possible to obtain the inertial sensor 1d which is low in possibility that the resonance occurs to damage the sensor element 20d with respect to an endurance test to a cyclic vibration such as a vibration test, and is therefore higher in reliability.

By adopting such a configuration, it is possible to further increase the reliability, and it is possible to obtain substantially equivalent advantages to those of the inertial sensor 1 according to the first embodiment.

6. Sixth Embodiment

Figure 19:
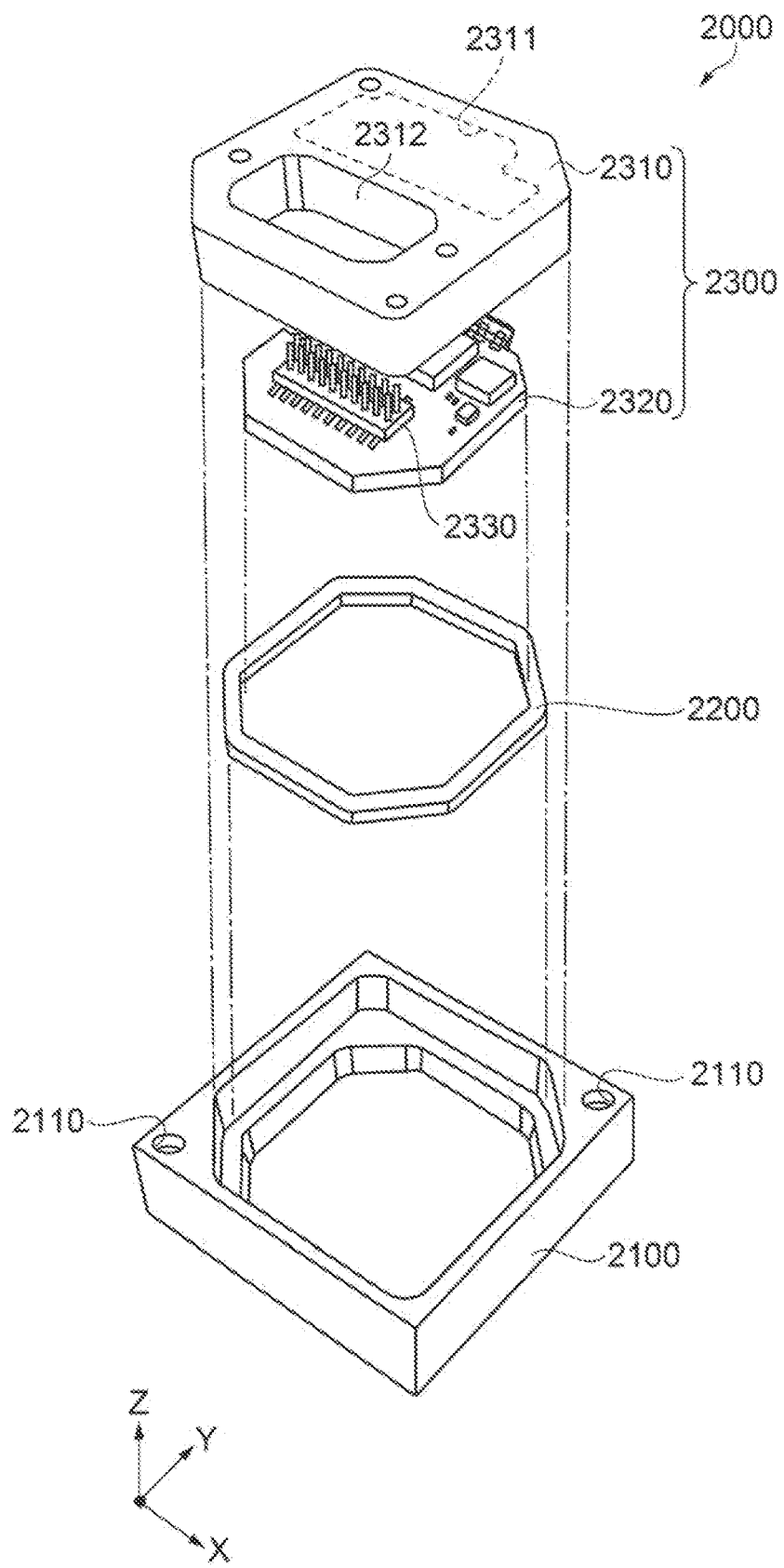
FIG. 19 is an exploded perspective view showing a schematic configuration of an inertial measurement device provided with an inertial sensor according to a sixth embodiment.

Then, an inertial measurement device 2000 provided with the inertial sensor 1d according to a sixth embodiment will be described with reference to FIG. 19 and FIG. 20. It should be noted that in the following description, the description will be presented illustrating a configuration of implementing the inertial sensor 1.

The inertial measurement device 2000 (IMU: Inertial Measurement Unit) shown in FIG. 19 is a device for detecting inertial momentum such as an attitude or a behavior of a moving body such as a car or a robot. The inertial measurement device 2000 functions as a so-called six-axis motion sensor provided with an acceleration sensor for detecting the accelerations Ax, Ay, and Az in respective directions along the three axes, and an angular velocity sensor for detecting the angular velocities ωx, ωy, and ωz around the three axes.

The inertial measurement device 2000 is a rectangular solid having a substantially square planer shape. Further, screw holes 2110 as fixators are formed in the vicinity of the two vertexes located in a diagonal direction of the square. It is possible to fix the inertial measurement device 2000 to an installation target surface of an installation target body such as a car by screwing two screws into the two screw holes 2110. It should be noted that it is also possible to reduce the inertial measurement device 2000 in size so as to be installed in, for example, a smartphone or a digital camera due to selection of the components or design changes.

The inertial measurement device 2000 has an outer case 2100, a bonding member 2200, and a sensor module 2300, and has a configuration of inserting the sensor module 2300 inside the outer case 2100 with the intervention of the bonding member 2200. Further, the sensor module 2300 has an inner case 2310 and a substrate 2320.

The outer shape of the outer case 2100 is a rectangular solid having a substantially square planar shape similarly to the overall shape of the inertial measurement device 2000, and the screw holes 2110 are respectively formed in the vicinity of the two vertexes located in the diagonal direction of the square. Further, the outer case 2100 is shaped like a box, and the sensor module 2300 is housed therein.

The inner case 2310 is a member for supporting the substrate 2320, and has a shape fitting into the inside of the outer case 2100. Further, the inner case 2310 is provided with a recess 2311 for preventing the contact with the substrate 2320, and an opening 2312 for exposing a connector 2330 described later. Such an inner case 2310 is bonded to the outer case 2100 via the bonding member 2200. Further, to a lower surface of the inner case 2310, there is bonded the substrate 2320 via an adhesive.

Figure 20:
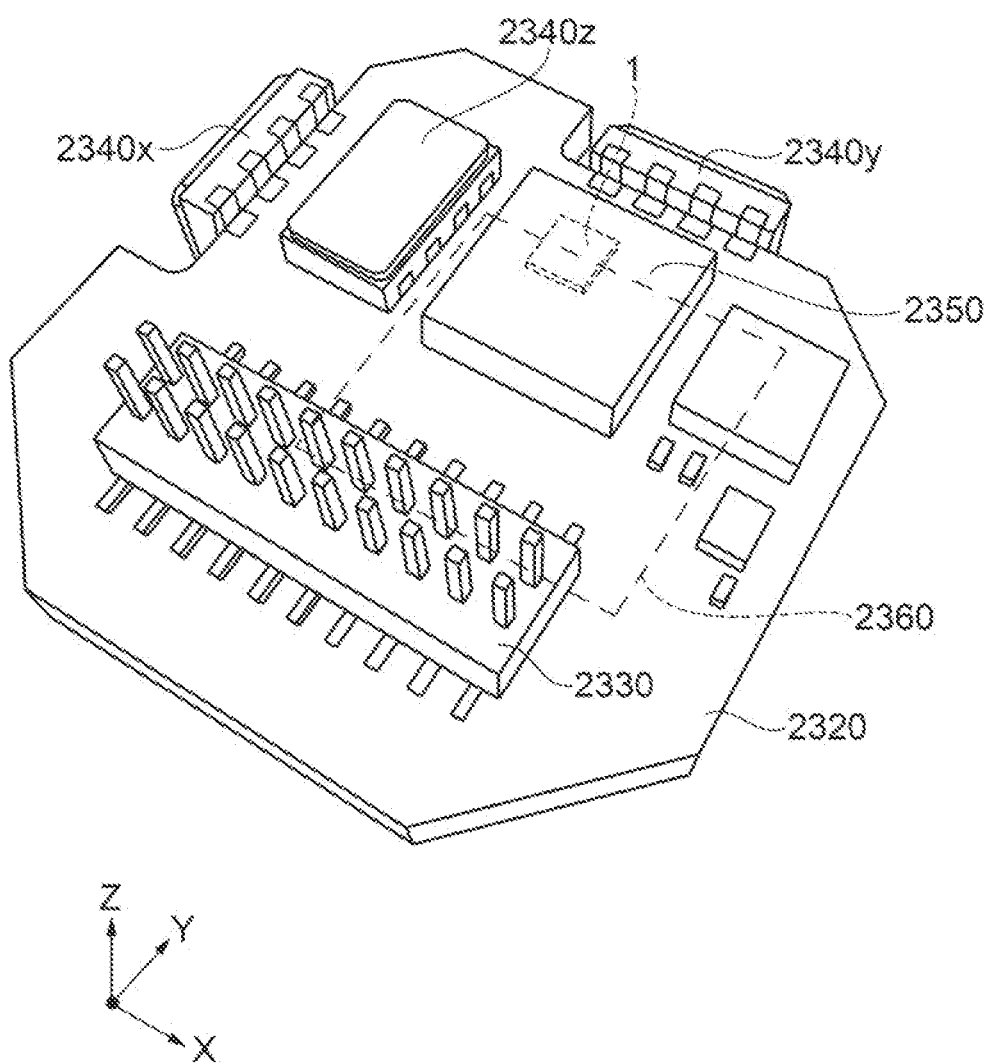
FIG. 20 is a perspective view of a substrate shown in FIG. 19.

As shown in FIG. 20, on the substrate 2320, there are mounted the connector 2330, an angular velocity sensor 2340z for detecting the angular velocity around the Z axis, an acceleration sensor 2350 for detecting the acceleration in each of the axial directions of the X axis, the Y axis, and the Z axis, and so on. Further, on side surfaces of the substrate 2320, there are mounted an angular velocity sensor 2340x for detecting the angular velocity around the X axis, and an angular velocity sensor 2340y for detecting the angular velocity around the Y axis.

The acceleration sensor 2350 includes at least one inertial sensor 1 for measuring the acceleration in the Z direction described above, and is capable of detecting the acceleration in a single axis direction, or detecting the accelerations in biaxial directions or triaxial directions as needed. It should be noted that each of the angular velocity sensors 2340x, 2340y, and 2340z is not particularly limited, and it is possible to use a vibratory gyro sensor using the Coriolis force.

Further, on the lower surface of the substrate 2320, there is mounted a control IC 2360. The control IC 2360 as a controller for performing control based on a detection signal output from the inertial sensor 1 is an MCU (Micro Controller Unit) incorporating a storage including a nonvolatile memory, an A/D converter, and so on, and controls each section of the inertial measurement device 2000. The storage stores a program defining a sequence and contents for detecting the acceleration and the angular velocity, a program for digitalizing the detection data and incorporating the result in packet data, subordinate data, and so on. It should be noted that on the substrate 2320, a plurality of electronic components is additionally mounted.

Since such an inertial measurement device 2000 uses the acceleration sensor 2350 including the inertial sensor 1, it is possible to obtain the inertial measurement device 2000 which is excellent in impact resistance and high in reliability.

What is claimed is:

1. An inertial sensor comprising:
   a substrate which is perpendicular to a Z axis when defining three axes perpendicular to each other as an X axis, a Y axis, and the Z axis, and which is provided with a stationary electrode;
   a movable body which is opposed to the stationary electrode in a Z-axis direction along the Z axis, which includes two planes perpendicular to the Z axis, and a side surface connecting the two planes to each other, and which is disposed so as to oscillate with respect to the substrate centering on an oscillation axis along the X axis; and
   a limiter which is opposed to the side surface of the movable body, and which is fixed to the substrate, wherein
   the movable body includes a pair of resilient portions in a portion opposed to the limiter, a movable electrode spaced from the limiter with the pair of resilient portions disposed therebetween, and a coupler extending from the movable electrode toward the limiter and the pair of resilient portions are coupled to a tip portion of the coupler so as to be spaced from the movable electrode and so that the coupler is disposed between the pair of resilient portions.

2. The inertial sensor according to claim 1, wherein each of the pair of resilient portions include a protrusion protruding in a direction along the Y axis.

3. The inertial sensor according to claim 1, wherein each of the pair of resilient portions include a protrusion protruding in a direction along the X axis.

4. The inertial sensor according to claim 1, wherein each of the pair of resilient portions include a protrusion protruding in a direction along the Z axis.

5. The inertial sensor according to claim 1, wherein each of the pair of resilient portions is provided with a through hole penetrating the two planes.

6. The inertial sensor according to claim 1, wherein the substrate includes an oxide film which is disposed on a surface at an opposite side to a surface opposed to the movable body.

7. An inertial measurement device comprising:
   the inertial sensor according to claim 1; and
   a controller configured to perform control based on a detection signal output from the inertial sensor.

* * * * *